S. E. DANIEL.
SLIDING-GATE.

No. 177,314.  Patented May 9, 1876.

Witnesses:
H. A. Daniels
C. M. Vaillant

Inventor
Samuel E. Daniel
By F. G. Daniels Atty

UNITED STATES PATENT OFFICE.

.SAMUEL E. DANIEL, OF COFFEE COUNTY, GEORGIA.

IMPROVEMENT IN SLIDING GATES.

Specification forming part of Letters Patent No. 177,314, dated May 9, 1876; application filed April 27, 1876.

*To all whom it may concern:*

Be it known that I, SAMUEL E. DANIEL, of Coffee county, State of Georgia, have invented an Improvement in Gates, of which the following is a specification:

The principal object of my invention is to construct a gate, so that it may be easily opened or closed by sliding it backward or forward on a horizontal bar by means of rollers suitably arranged, and at the same time be durable and cheap in its construction.

Figure 2:
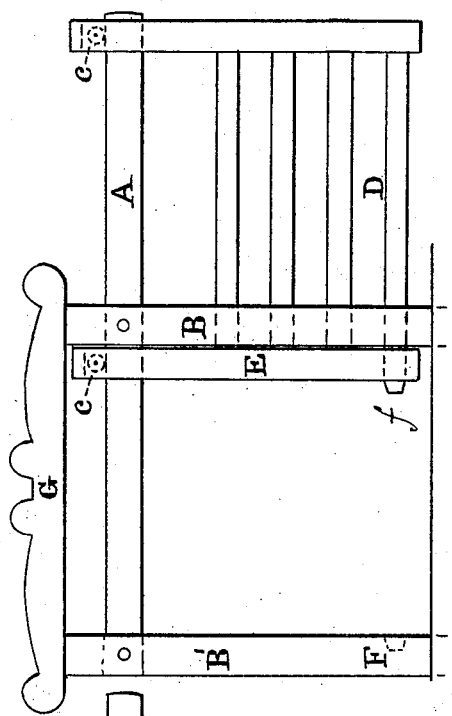
Figure 4:
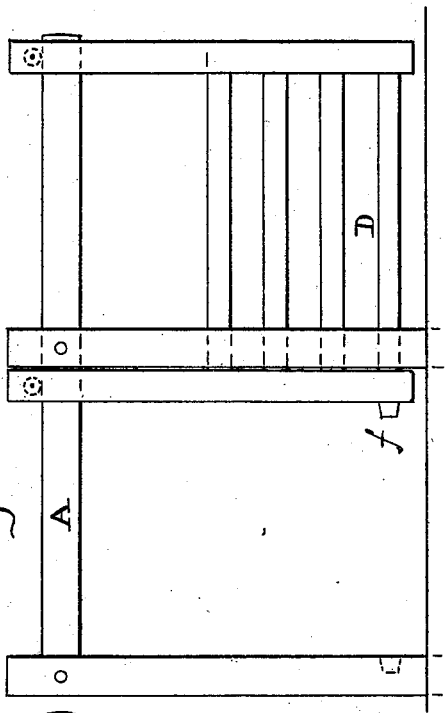
Figure 1:
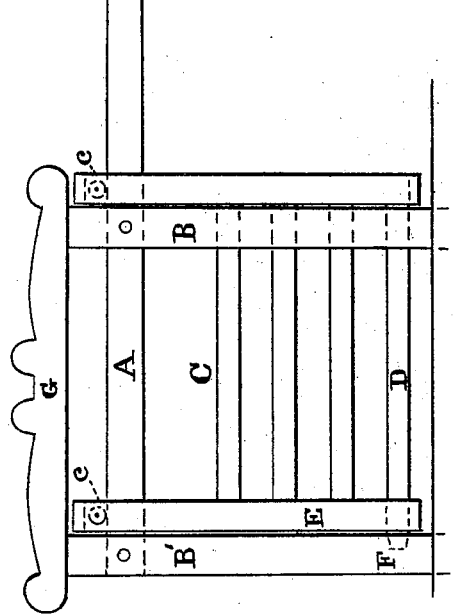
Figure 3:
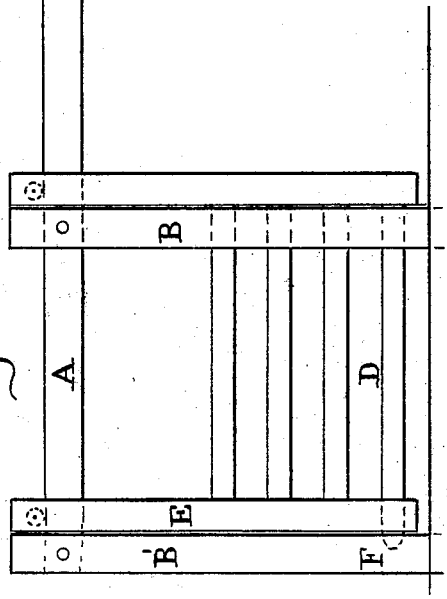

Referring to the accompanying drawing, Figure 1 represents a view of the gate when closed, and Fig. 2 when opened. Figs. 3 and 4 represent the same views of the invention in a modified form.

The invention consists in the horizontal bar A, rigidly fixed to the upright posts B and B', in combination with the gate C, suspended thereon by rollers $c$, properly adjusted and arranged, so that the gate may slide or be rolled out or in on the bar A, the bottom rail of the gate D extending through the side-piece E, as at $f$, far enough to enter the mortise F in the post B', and thereby hold the gate firmly in its position when closed.

The cross bar G is fastened firmly to the two posts B and B', and tends to hold them securely in their position. The horizontal bar A being likewise firmly pinned to the same posts, assists in holding them in their position.

As shown by the drawings in Figs. 3 and 4, the gate can be constructed without the cross-bar G by elevating the horizontal bar A to the top of the posts B and B'. It, being securely pinned to the said posts B and B', will prevent them from spreading apart or otherwise getting out of position.

It will be readily seen that the latter construction will enable wagons loaded to a great height with light material, such as hay or straw, to pass under the bar A, while in the construction shown in Figs. 1 and 2 the bar A would be in the way of the load, unless the gate should be made of unusual height.

The first method of construction, being more ornamental, is intended for the entrance-gate to the dwelling inclosure, or where high loads of light material, above referred to, do not pass, while the second method of construction is intended for a farm-gate proper, or the gate through which teams pass in transferring the farm products from the fields to the barns and granaries.

I am aware that sliding gates have before been constructed, and are well known, but such have heretofore required a post exterior to the gate-frame proper, which post, it will be observed, I dispense with by keying the cross-piece A to both standards B and B', and allowing it to extend beyond post B to support the gate when opened.

I claim—

A gate, consisting of two vertical posts and a series of horizontal bars, the lower one of which projects as at $f$, said vertical posts being provided with the rollers $c$, combined with the posts B and B', and horizontal bar A, extending beyond post B, the said post B' having the mortise F, as and for the purposes specified.

SAMUEL E. DANIEL.

Witnesses:
G. S. FARMER,
JNO. JAMES.